(12) United States Patent
Gade et al.

(10) Patent No.: US 8,855,942 B2
(45) Date of Patent: Oct. 7, 2014

(54) ANODE BLEED CONTROL STRATEGY FOR IMPROVED WATER MANAGEMENT AND HYDROGEN UTILIZATION

(75) Inventors: Prasad Gade, Webster, NY (US); Manish Sinha, Pittsford, NY (US); Jon R. Sienkowski, Rochester, NY (US); Balasubramanian Lakshmanan, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1575 days.

(21) Appl. No.: 11/764,089

(22) Filed: Jun. 15, 2007

(65) Prior Publication Data

US 2008/0312849 A1 Dec. 18, 2008

(51) Int. Cl.
*G01N 31/00* (2006.01)
*H01M 8/04* (2006.01)

(52) U.S. Cl.
CPC ...... *H01M 8/04462* (2013.01); *H01M 8/04761* (2013.01); *Y02E 60/50* (2013.01); *H01M 8/04231* (2013.01); *H01M 8/04992* (2013.01)
USPC ........................................................ 702/31

(58) Field of Classification Search
USPC ........................................................ 702/31
See application file for complete search history.

(56) References Cited

U.S. PATENT DOCUMENTS

| 5,320,718 | A | * | 6/1994 | Molter et al. ................. 205/555 |
| 2002/0102445 | A1 | * | 8/2002 | Senner ............................. 429/13 |
| 2003/0180600 | A1 | * | 9/2003 | Naruse et al. .................... 429/38 |
| 2004/0241063 | A1 | * | 12/2004 | Appleby et al. ............... 422/280 |
| 2006/0010987 | A1 | * | 1/2006 | Fraser et al. ................ 73/861.07 |
| 2007/0009772 | A1 | * | 1/2007 | Iio ................................... 429/13 |
| 2007/0141421 | A1 | * | 6/2007 | Hobmeyr et al. ............... 429/26 |
| 2007/0287044 | A1 | * | 12/2007 | Arthur et al. .................... 429/25 |
| 2008/0014472 | A1 | * | 1/2008 | Logan ............................. 429/13 |
| 2008/0262701 | A1 | * | 10/2008 | Williams et al. .............. 701/103 |

* cited by examiner

*Primary Examiner* — Stephen Cherry
(74) *Attorney, Agent, or Firm* — John A. Miller; Miller IP Group, PLC

(57) ABSTRACT

A control strategy for bleeding an anode side of fuel cell stack in a fuel cell system that improves water management and addresses durability and performance concerns. The method includes determining when to begin the anode bleed, typically by estimating or measuring the amount of nitrogen in the anode side of the stack. The method also includes determining when to end the anode bleed based on the volume of gas that has been bled. The method determines the mole flow rate of the anode gas flowing through a bleed valve, integrates the mole flow rate to get the number of moles of the gas that have passed through the bleed valve, determines a desired amount of moles to be bled, and ends the bleed when the actual number of moles of the gas equals the desired number of moles of the gas.

15 Claims, 2 Drawing Sheets

ANODE BLEED CONTROL STRATEGY FOR IMPROVED WATER MANAGEMENT AND HYDROGEN UTILIZATION

BACKGROUND OF THE INVENTION

1. Field of the Invention

This invention relates generally to a control strategy for controlling an anode bleed from a fuel cell stack and, more particularly, to a control strategy for controlling an anode bleed from split fuel cell stacks that is based on the amount of anode gas that is bled so as to improve water management and address durability and performance issues.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are permeable and thus allow nitrogen in the air from the cathode side of the stack to permeate therethrough and collect in the anode side of the stack, referred to in the industry as nitrogen cross-over. Even though the anode side pressure may be slightly higher than the cathode side pressure, the cathode side partial pressures will cause air to permeate through the membrane. Nitrogen in the anode side of the fuel cell stack dilutes the hydrogen such that if the nitrogen concentration increases above a certain percentage, such as 50%, the fuel cell stack becomes unstable and may fail. It is known in the art to provide a bleed valve at the anode exhaust gas output of the fuel cell stack to remove nitrogen from the anode side of the stack.

It has been proposed in the art to provide stack order switching or anode flow-shifting in a fuel cell system that employs split stacks. Particularly, valves and plumbing in the system are provided so that the anode exhaust gas exiting a first sub-stack is sent to the anode of a second sub-stack, and the anode exhaust gas exiting the second sub-stack is sent to the anode of the first sub-stack in a cyclical manner.

Anode flow-shifting has often been thought to cause carbon corrosion and consequently higher voltage degradation rates due to poor water removal capabilities during normal system operation. Also, anode flow-shifting has often resulted in lower hydrogen utilization resulting in lower fuel cell system efficiency, especially at low-to-mid power levels. One area to address these concerns is an improved control strategy for an anode bleed from flow-shifting sub-stacks.

SUMMARY OF THE INVENTION

In accordance with the teachings of the present invention, a control strategy for bleeding an anode side of a fuel cell stack in a fuel cell system is disclosed that improves water management and addresses durability and performance concerns. The method includes determining when to begin the anode bleed, typically by estimating or measuring the amount of nitrogen in the anode side of the stack. The method also includes determining when to end the anode bleed based on the volume of gas that has been bled. The method determines the mole flow rate of the anode gas flowing through a bleed valve, integrates the mole flow rate to get the number of moles of the gas that have passed through the bleed valve, determines a desired amount of moles to be bled, and ends the bleed when the actual number of moles of the gas equals the desired number of moles of the gas.

Additional features of the present invention will become apparent from the following description and appended claims taken in conjunction with the accompanying drawings.

DETAILED DESCRIPTION OF THE EMBODIMENTS

The following discussion of the embodiments of the invention directed to a control strategy for ending an anode bleed in an anode flow-shifting fuel cell architecture is merely exemplary in nature, and is in no way intended to limit the invention or its applications or uses.

Figure 1:
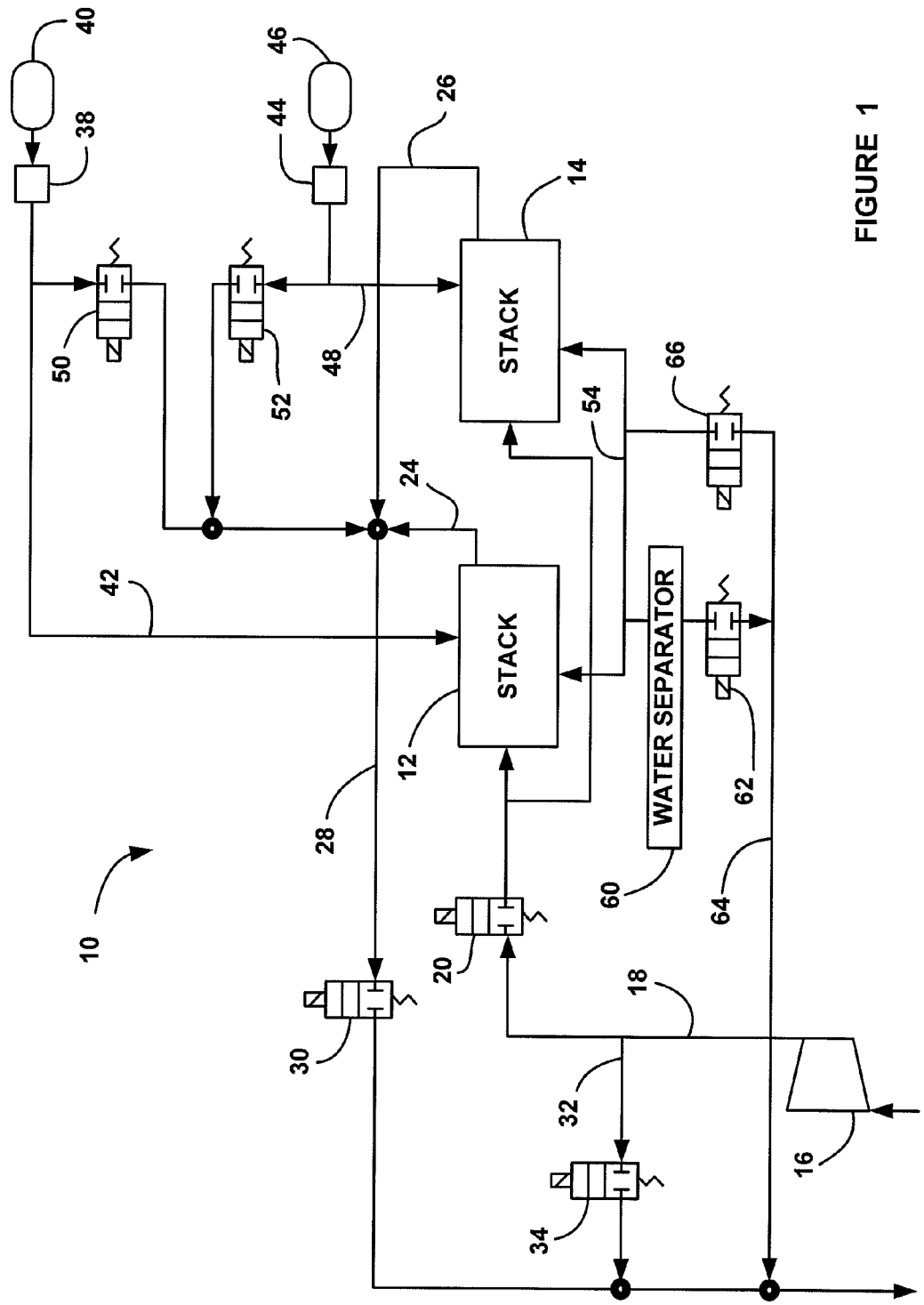
FIG. 1 is a schematic plan view of a fuel system that includes split fuel cell stacks and employs anode flow-shifting.

FIG. 1 is a schematic block diagram of a fuel cell system 10 including a first split fuel cell stack 12 and a second split fuel cell stack 14. A compressor 16 provides cathode input air on cathode input line 18 to the split stacks 12 and 14 through a normally closed cathode input valve 20. Cathode exhaust gas is output from the split stack 12 on line 24 and cathode exhaust gas is output from the split stack 14 on line 26 where the cathode exhaust gas is combined into a single cathode output line 28. A normally closed cathode back pressure valve 30 controls the flow of the cathode exhaust gas through the line 28. A cathode by-pass line 32 between the input line 18 and the output line 28 allows the cathode input air to by-pass the stacks 12 and 14. A normally closed by-pass valve 34 controls whether the cathode air by-passes the stacks 12 and 14. If the valves 20 and 30 are closed and the valve 34 is open, then air from the compressor 16 will by-pass the stacks 12 and 14. Typically, a cathode humidification unit (not shown) will be provided at a suitable location in the cathode input line 18.

In this non-limiting embodiment, the split stacks 12 and 14 employ anode flow-shifting where the anode reactant gas flows back and forth through the split stacks 12 and 14 at a predetermined cycle in a manner that is well understood to those skilled in the art. An injector 38 injects hydrogen gas from a hydrogen gas source 40 through anode line 42 to the split stack 12 and an injector 44 injects hydrogen gas from a hydrogen source 46 through anode line 48 to the split stack 14 in an alternating sequence.

A water separator 60 is coupled to the connector line 54 and collects water in the anode gas flow between the split stacks 12 and 14. A normally closed drain valve 62 can be employed that is periodically opened to vent the water to the cathode exhaust gas line 28 on line 64. Further, an anode exhaust gas purge valve 66 can be provided. Although not specifically shown, a cooling fluid would be pumped through the split stacks 12 and 14 by a pump to provide temperature control of the split stacks 12 and 14.

As discussed above, it is desirable to periodically bleed the anode side of the split stacks 12 and 14 to remove nitrogen from the anode side of the stacks 12 and 14 that may otherwise dilute the hydrogen and affect cell performance. Normally closed bleed valves 50 and 52 are provided for this purpose. When an anode bleed is commanded, the bleed valve 50 or 52 is opened and the bled anode exhaust gas is sent to the cathode exhaust gas line 28 depending on which direction the anode gas is currently flowing. Particularly, if the hydrogen is being injected into the split stack 12 from the source 40 when a bleed is triggered, then the bleed valve 52 is opened. Likewise, if the hydrogen is being injected into the split stack 14 from the source 46 when a bleed is triggered, then the bleed valve 50 is opened. The flow-shifting will typically occur several times during a normal bleed duration so that the bleed valves 50 and 52 have to be opened and closed several times in time with the flow switching.

The viability of anode flow-shifting architectures has been a concern from durability, i.e., run voltage degradation, and hydrogen utilization, especially during low power operation. The present invention proposes a control strategy for an anode bleed that increases stack durability by improving anode water management during the bleed, and also impacting hydrogen utilization especially at idle and low power operation. The proposed control algorithm can easily be scaled for different stack sizes and different bleed valves. As will be discussed in detail below, the proposed control strategy provides a robust reactant purge capability by utilizing physics based concepts, such as anode residence time, during a bleed. Further, the proposed control strategy improves the ability of the bleed to move anode water from the flow fields to the manifold for removal from a water separator and/or a bleed valve. Also, the proposed control strategy significantly improves i.e., reduces, the bleed frequency, and thus, improves hydrogen utilization. This improvement is especially significant at low power where the fuel cell system efficiency typically drops due to poor hydrogen utilization. Further, the proposed control strategy significantly improves stack stability as measured by cell voltage spread and voltage bounce (average voltage) between the split stacks. The proposed control strategy also improves the robustness to sensor malfunction and dynamics by ensuring a wait time between bleeds, and robustness to stack instability metrics that may be triggered by non-anode events.

During operation of the fuel cell system 10, the injector banks 38 and 44 are activated alternately based on a shift period for the particular application, and anode pressure setpoint. An anode bleed is triggered based on certain criteria, such as the concentration of hydrogen in the anode being below a predetermined minimum, the voltage spread of the cell voltages between a minimum voltage and a maximum voltage in either of the sub-stacks 12 or 14 is greater than a predetermined voltage spread, or the absolute value of the difference between the average cell voltages of the two sub-stacks 12 and 14 is less than a predetermined bounce voltage. The anode bleed is controlled so that the opposite bleed valve 50 or 52 is open from whichever injector bank 38 or 44 is active.

The proposed control strategy addresses a number of problem areas with current anode bleed strategies. Particularly, a first concern is that current strategies are not effective in removing anode water from the anode side of the split stacks 12 and 14. When a bleed request is received, the control algorithm alternately opens the bleed valve 50 or 52 opposite to the active injector 38 or 44 in time with the flow-switching so that the bleed valve 50 or 52 at the output of the second sub-stack is open to bleed the nitrogen and water from the sub-stacks 12 and 14. Typically, the bleed time is significantly longer than the flow-shifting reversal time such that the bleed valves 50 and 52 are opened and closed many times during a bleed event. In the known approach, because the bleed direction is reversed many times during the bleed event, anode water may not be effectively removed from the anode flow fields.

A second concern with current bleed strategies is bleeding a significant amount of fresh hydrogen during the bleed event that impacts system efficiency. As is apparent from the configuration of system 10, when the flow direction is reversed, fresh hydrogen is bled that was just previously injected into the particular split stack 12 or 14. Not only does this waste fresh hydrogen, but potentially traps nitrogen bubbles between the split stacks 12 and 14.

A third concern with current bleed strategies has to do with hydrogen sensing dynamics that may result in an over bleed that impacts system efficiency. Often, fuel cell modules are run with hydrogen sensors to benchmark system metrics. Hydrogen sensors are preferred because they eliminate impact of errors in the nitrogen concentration estimation from the nitrogen model used to determine nitrogen concentration. The nitrogen model may have errors over the life of the stack as membrane cross-over rates change due to changes in MEA permeability and/or pinholes. However, when sensors are used, the control needs to comprehend the dynamics of the sensor itself. It has been shown that during and after the first bleed, the thermal conductivity device (TCD) continues to fall. This is counter-intuitive because during the bleed, the hydrogen concentration should increase. Also, after the second bleed for twenty seconds or so during the bleed, the hydrogen concentration keeps rising. This is again counter-intuitive. Thus, a correct control strategy should wait until after the bleed before bleeding again.

A fourth concern with current bleed strategies has to do with non-anode related low performing cell (LPC) stressors that may result in a continuous bleed that affects efficiency and dries out membranes. An anode bleed may be triggered as a remedial action in response to a large voltage spread or voltage bounce. The spread and bounce triggers may occur due to cathode flooding, abnormal thermal or air sub-system control, and the anode bleed may not remedy them.

The proposed bleed algorithm is based on an anode residence time scaling factor model ($\tau$) that calculates the duration of the bleed to allow multiple residences of stack anode volume to be bled to ensure the entire volume of the intended nitrogen is flushed out in one bleed event. The model is dependent on the anode-to-cathode differential pressure, stack anode-out and stack cathode-out pressures and coolant temperature. The model is also explicitly dependent on stack anode volume, i.e., the volume between the injector bank 38 or 44 and the bleed valve 50 or 52, and the $k_v$ value (bleed valve orifice size) of the bleed valve 50 or 52.

In the current anode bleed strategies that employ a nitrogen concentration model or measure the nitrogen or hydrogen concentration directly, the bleed is started when the concentration of nitrogen rises to a predetermined level. The anode bleed is continued until the nitrogen concentration is reduced to a lower predetermined level at which time the bleed is stopped. For low current density operation, such as during vehicle idling, where the input flow of the cathode air is low, the amount of nitrogen crossing the membrane is also low. Therefore, the concentration of nitrogen in the anode side does not accumulate very quickly. However, once the nitrogen level does accumulate to a predetermined concentration, then the bleed is triggered. Again, because the anode flow would be low at low power levels, the length of the bleed can be relatively long. When basing the bleed on the concentration of nitrogen in the anode side of the split stacks 12 and 14, typically the bleeds come often because of this, and thus, the problems discussed above sometimes occur. According to the invention, the bleed ending time is not based on the concentration of nitrogen in the anode side, but is based on how much of the anode volume has been bled.

The mole flow rate ṁ of the gas through the bleed valve 50 or 52 is defined by:

$$\dot{m} = \frac{k_v}{4.633}\sqrt{\frac{P_{AnOut}^2 - P_{CaOut}^2}{(MW)T_{cool}}} \quad (\text{mol}/s) \quad (1)$$

Where MW is the molecular weight of the nitrogen, $P_{AnOut}$ is the pressure at the stack anode outlet, $P_{CaOut}$ is the pressure at the stack cathode outlet and $T_{cool}$ is the cooling fluid temperature.

The integral of the mole flow rate ṁ is a measure of the cumulative moles of the gas that have passed though the bleed valve 50 or 52. If the integral of the mole flow rate ṁ is greater than or equal to the desired moles of gas n to be purged out, as determined by equation (2) below, then the bleed valve 50 or 52 is commanded closed.

$$n = \tau\left(\frac{P_{AnOut}V_{An}}{RT_{cool}}\right) \quad (\text{mol}/s) \quad (2)$$

Where R is the universal gas constant, $V_{An}$ is the volume of the anode in the sub-stacks and $\tau$ is the anode residence time scaling factor of the molar bleed volume to be bled out. The scaling factor $\tau$ can be determined by any suitable manner, such as by ad hoc techniques that look at performance and design of experiment techniques that provide numerical optimization as would be well understood to those skilled in the art.

The bleed valve 50 or 52 is triggered open whenever the permeated nitrogen from cathode-to-anode reaches a pre-specified threshold as a function of stack current density. The bleed valve 50 or 52 is closed as soon as the time to be kept open condition is dictated by the integral of equation (1) being greater than or equal to the desired moles of gas n from equation (2) is satisfied.

Figure 2:
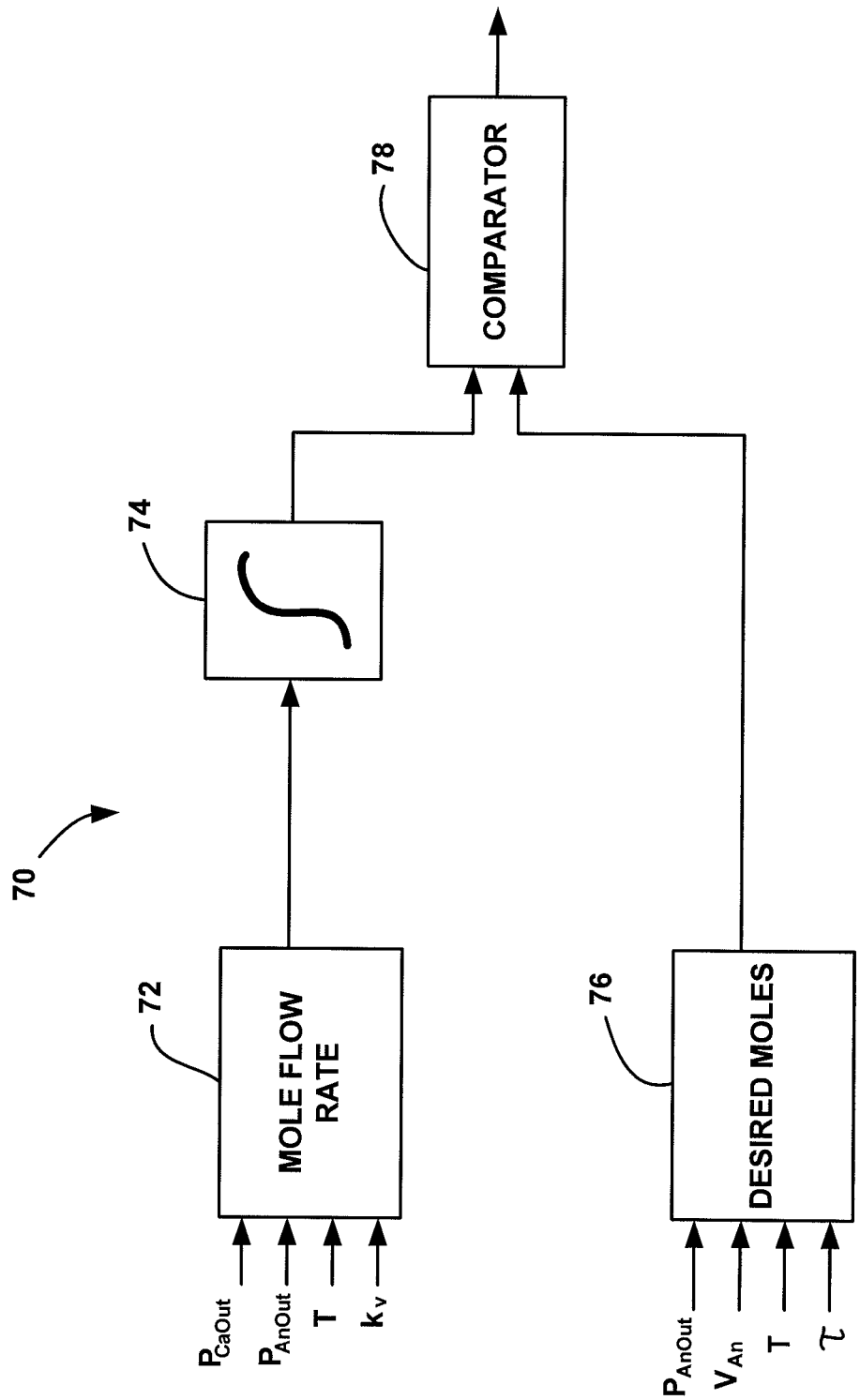
FIG. 2 is a block diagram depicting a control strategy for ending an anode bleed in an anode flow-shifting architecture, according to an embodiment of the present invention.

FIG. 2 is a block diagram 70 depicting the control strategy for ending an anode bleed, as discussed above, according to an embodiment of the present invention. The mole flow rate ṁ is calculated at box 72 based on equation (1) above. An integral of the mole flow rate ṁ is generated at box 74 as a measure of the cumulative moles of the gas that has already passed through the bleed valve 50 or 52. The desired number of moles of the gas n to be bled is calculated at box 76 based on equation (2). The actual amount of moles of the gas from the integrator 74 and the desired amount of moles of the gas n to be bled from the processor 76 are sent to a comparator 78 so that when the actual amount of the moles reaches the desired amount of the moles n, the algorithm will stop the bleed.

A smaller anode residence time scaling factor $\tau$ implies a smaller fraction of the quantity of volume being flushed out. Decreasing the anode residence time scaling factor $\tau$, however, does not increase the frequency of the bleed event. It is primarily governed by the nitrogen set-point for the bleed trigger. The smaller the nitrogen set-point, the higher the hydrogen fraction, the more frequent are the bleed events.

For low power ranges, i.e., less than 0.2 amps/cm$^2$, the stack can sustain a higher anode residence time with higher nitrogen set-points, thus bleeding less frequently, but for relatively longer durations of time. At high-power levels, i.e., greater than 0.8 amps/cm$^2$, because of higher pressure set-points, frequent bleeds for shorter durations of time may be required to keep the stack from becoming unstable.

To avoid potential instability due to prolonged bleeds, for example, due to integrator stall in a proactive bleed during transients leading to a reactive bleed triggers being on for too long, bleeds must be preempted. One way of achieving this is to define the what "too long" of a lead time means at each current density, and ensuring that it is less than or equal to the time the bleed valve 50 or 52 should have been open at that stack current density when triggered by the nitrogen model alone. The forced bleed pause time should be such that it satisfies a minimum time between bleed requirements at the current density, such as 0.1 seconds.

Sometimes there may not be an anode bleed for a long time due to frequent bleed pauses during repeated up-transients. In such a case, a second table is used that forces the bleed to enable just long enough so that the system can be excited. Usually this bleed time is set at about 10 seconds. The definition of a long time varies as a function of stack current density.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining when to bleed an anode of a fuel cell stack, said method comprising:

determining when to begin the anode bleed by a controller, wherein determining when to begin the anode bleed includes measuring the concentration of nitrogen in the anode of the fuel cell stack; and determining when to end the anode bleed based on determining the volume of anode gas that has already been bled during the bleed event by the controller.

2. The method according to claim 1 wherein determining when to end the anode bleed includes determining the mole flow rate of the anode gas through a bleed valve, integrating the mole flow rate to get the number of moles of the gas that have passed through the bleed valve, determining a desired amount of moles of the gas to be bled, and ending the bleed when the actual number of moles of the gas that have passed through the bleed valve equals the desired number of moles of the gas to be bled.

3. The method according to claim 2 wherein determining the mole flow rate of the anode gas through the bleed valve includes using the equation:

$$\dot{m} = \frac{k_v}{4.633}\sqrt{\frac{P_{AnOut}^2 - P_{CaOut}^2}{(MW)T_{cool}}} \quad (mol/s)$$

where $\dot{m}$ is the mole flow rate, MW is the molecular weight of nitrogen, $P_{AnOut}$ is the pressure at the stack anode outlet, $P_{CaOut}$ is the pressure at the stack cathode outlet, $k_v$ is the bleed valve orifice size, and $T_{cool}$ is a cooling fluid temperature.

4. The method according to claim 2 wherein determining the desired amount of moles to be bled includes determining and using an anode residence time scaling factor that defines a number of anode volumes.

5. The method according to claim 4 wherein determining the desired amount of moles to be bled includes using the equation:

$$n = \tau\left(\frac{P_{AnOut}V_{An}}{RT_{cool}}\right) \quad (mol/s)$$

where n is the desired number of moles, R is the universal gas constant, $V_{An}$ is the volume of the anode in the stack, $P_{AnOut}$ is the pressure at the stack anode outlet, $\tau$ is the scaling factor and $T_{cool}$ is a cooling fluid temperature.

6. The method according to claim 4 wherein the scaling factor is determined by experimentation.

7. The method according to claim 1 wherein the fuel cell stack includes a first split stack and a second split stack that employ anode flow-shifting.

8. A method for controlling an anode bleed from first and second split fuel cell stacks that operate under anode flow-shifting through first and second bleed valves, said method comprising:

determining when to begin the anode bleed;

determining the mole flow rate of the anode gas flowing through the bleed valves, wherein determining the mole flow rate of the anode gas through the bleed valves includes using the equation:

$$\dot{m} = \frac{k_v}{4.633}\sqrt{\frac{P_{AnOut}^2 - P_{CaOut}^2}{(MW)T_{cool}}} \_(mol/s)$$

where $\dot{m}$ is the mole flow rate, MW is the molecular weight of nitrogen, $P_{AnOut}$ is the pressure at the stack anode outlet, $P_{CaOut}$ is the pressure at the stack cathode outlet, $k_v$ is the bleed valve orifice size, and $T_{cool}$ is a cooling fluid temperature;

integrating the mole flow rate to get the number of moles of the gas that have passed through the bleed valves;

determining a desired amount of moles to be bled; and ending the anode bleed when the actual number of moles of the gas that have passed through the bleed valves equals the desired number of moles of the gas to be bled.

9. The method according to claim 8 wherein determining the desired amount of moles to be bled includes determining and using an anode residence time scaling factor that defines a number of anode volumes.

10. The method according to claim 9 wherein determining the desired amount of moles to be bled includes using the equation:

$$n = \tau\left(\frac{P_{AnOut}V_{An}}{RT_{cool}}\right) \quad (mol/s)$$

where n is the desired number of moles, R is the universal gas constant, $V_{An}$ is the volume of the anode in the split stacks, $P_{AnOut}$ is the pressure at the stack anode outlet, $\tau$ is the scaling factor and $T_{cool}$ is a cooling fluid temperature.

11. The method according to claim 9 wherein the scaling factor is determined by experimentation.

12. The method according to claim 8 wherein determining when to begin the anode bleed includes determining the concentration of nitrogen in the anode of the fuel cell stack using a nitrogen estimating model.

13. The method according to claim 8 wherein determining when to begin the anode bleed includes measuring the concentration of nitrogen in the anode of the split stacks.

14. A method for controlling an anode bleed from first and second split fuel cell stacks that operate under anode flow-shifting through first and second bleed valves, said method comprising:

determining when to start the anode bleed based on the concentration of nitrogen in the anode of the split stacks by a controller; and determining when to end the anode bleed based on an anode time residence model that identifies the number of volumes of anode gas to be bled by the controller, wherein determining when to end the anode bleed includes determining the mole flow rate of the anode gas through the bleed valves, integrating the mole flow rate to get the number of moles of the gas that have passed through the bleed valves, determining a desired amount of moles of the gas to be bled, and ending the bleed when the actual number of moles of the gas that have passed through the bleed valves equals the desired number of moles of the gas to be bled, and wherein determining the mole flow rate of the anode gas through the bleed valves includes using the equation:

$$\dot{m} = \frac{k_v}{4.633}\sqrt{\frac{P_{AnOut}^2 - P_{CaOut}^2}{(MW)T_{cool}}} \_(mol/s)$$

where $\dot{m}$ is the mole flow rate, MW is the molecular weight of nitrogen, $P_{AnOut}$ is the pressure at the stack anode outlet, $P_{CaOut}$ is the pressure at the stack cathode outlet, $k_v$ is the bleed valve orifice size, and $T_{cool}$ is a cooling fluid temperature.

15. The method according to claim 14 wherein determining the desired amount of moles to be bled includes using the equation:

$$n = \tau\left(\frac{P_{AnOut} V_{An}}{RT_{cool}}\right) \; (\text{mol}/s)$$

where n is the desired number of moles, R is the universal gas constant, $V_{An}$ is the volume of the anode in the split stacks, $P_{AnOut}$ is the pressure at the stack anode outlet, $\tau$ is an anode residence time scaling factor and $T_{cool}$ is a cooling fluid temperature.

* * * * *